(12) United States Patent
Reinke et al.

(10) Patent No.: US 11,679,949 B2
(45) Date of Patent: Jun. 20, 2023

(54) DOCUMENT SCANNER WITH AUTOMATED DOCUMENT ALIGNMENT SYSTEM

(71) Applicant: KODAK ALARIS INC., Rochester, NY (US)

(72) Inventors: Stephen M. Reinke, Rochester, NY (US); Randy R. Maysick, Rochester, NY (US); Robert M. Westcott, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 254 days.

(21) Appl. No.: 15/914,333

(22) Filed: Mar. 7, 2018

(65) Prior Publication Data

US 2018/0257887 A1    Sep. 13, 2018

Related U.S. Application Data

(60) Provisional application No. 62/468,137, filed on Mar. 7, 2017.

(51) Int. Cl.
*B65H 9/06* (2006.01)
*B65H 3/06* (2006.01)
(Continued)

(52) U.S. Cl.
CPC ............. *B65H 9/06* (2013.01); *B65H 3/06* (2013.01); *B65H 3/0661* (2013.01); *B65H 3/565* (2013.01);
(Continued)

(58) Field of Classification Search
CPC .... B65H 3/063; B65H 3/0653; B65H 3/0607; B65H 3/0615; B65H 3/0661;
(Continued)

(56) References Cited

U.S. PATENT DOCUMENTS 5,552,859 A     9/1996  Nakagawa et al.
5,988,623 A *  11/1999  Worley .................. B41J 13/103
                                              271/9.02
(Continued)

FOREIGN PATENT DOCUMENTS

CN     104709739 A    6/2015
CN     106144683 A   11/2016
(Continued)

OTHER PUBLICATIONS

International Search Report dated Jul. 13, 2018 in International Application No. PCT/US2018/021163.
(Continued)

*Primary Examiner* — Howard J Sanders
(74) *Attorney, Agent, or Firm* — Hogan Lovells US LLP

(57) ABSTRACT

Embodiments are directed at a systems, methods, and apparatuses for automatically aligning the lead edges of a document stack loaded in a scanner system. An automated jogger system includes feeder gate elements which are driven forward and backwards in an oscillating motion. This motion causes the documents in the stack to slide between each other, causing the documents to move and rotate towards the feeder gate elements, aligning the lead edges of the stack prior to being fed into the document scanner.

20 Claims, 14 Drawing Sheets

(51) Int. Cl.
*B65H 7/02* (2006.01)
*B65H 3/56* (2006.01)
*H04N 1/00* (2006.01)
*B65H 3/62* (2006.01)

(52) U.S. Cl.
CPC ............... *B65H 3/62* (2013.01); *B65H 7/02* (2013.01); *H04N 1/0066* (2013.01); *H04N 1/00681* (2013.01); *H04N 1/00694* (2013.01); *H04N 1/00702* (2013.01); *H04N 1/00718* (2013.01); *H04N 1/00787* (2013.01); *H04N 1/00793* (2013.01); *B65H 2404/623* (2013.01); *B65H 2801/39* (2013.01)

(58) Field of Classification Search
CPC ...... B65H 3/0669; B65H 3/0684; B65H 3/34; B65H 3/54; B65H 3/56; B65H 3/565; B65H 3/66; B65H 9/06; B65H 9/08; B65H 9/10; B65H 9/101; B65H 9/106; B65H 2301/362; B65H 2301/3621; B65H 2301/363; B65H 2404/722; B65H 2404/725

See application file for complete search history.

(56) References Cited

U.S. PATENT DOCUMENTS

| | | | |
|---|---|---|---|
| 6,056,285 A | 5/2000 | Kikuta et al. | |
| 6,199,855 B1 * | 3/2001 | Choeng | B65H 3/0661 271/122 |
| 7,000,916 B2 * | 2/2006 | Asada | B65H 3/0661 271/121 |
| 8,465,016 B2 * | 6/2013 | Winburne | B65H 3/0661 271/117 |
| 8,915,495 B2 * | 12/2014 | Jariabka | B65H 3/0661 271/117 |
| 10,099,874 B2 * | 10/2018 | Kuriki | B65H 3/0638 |
| 10,214,373 B2 * | 2/2019 | Sata | G03G 15/6511 |
| 2004/0017039 A1 | 1/2004 | Asada et al. | |
| 2010/0244368 A1 * | 9/2010 | Lin | B65H 3/0684 271/121 |
| 2010/0270732 A1 * | 10/2010 | Huang | B65H 3/0661 271/109 |
| 2017/0225917 A1 * | 8/2017 | Kakita | G03G 15/6529 |
| 2020/0307930 A1 * | 10/2020 | Okamoto | B65H 1/14 |

FOREIGN PATENT DOCUMENTS

| | | |
|---|---|---|
| CN | 106429542 A | 2/2017 |
| EP | 0942582 A1 | 9/1999 |
| JP | 59102736 A | 6/1984 |
| JP | H0616271 A | 1/1994 |

OTHER PUBLICATIONS

Chinese Office Action dated Sep. 7, 2020 in Chinese Patent Application No. 20188006064.7.

* cited by examiner

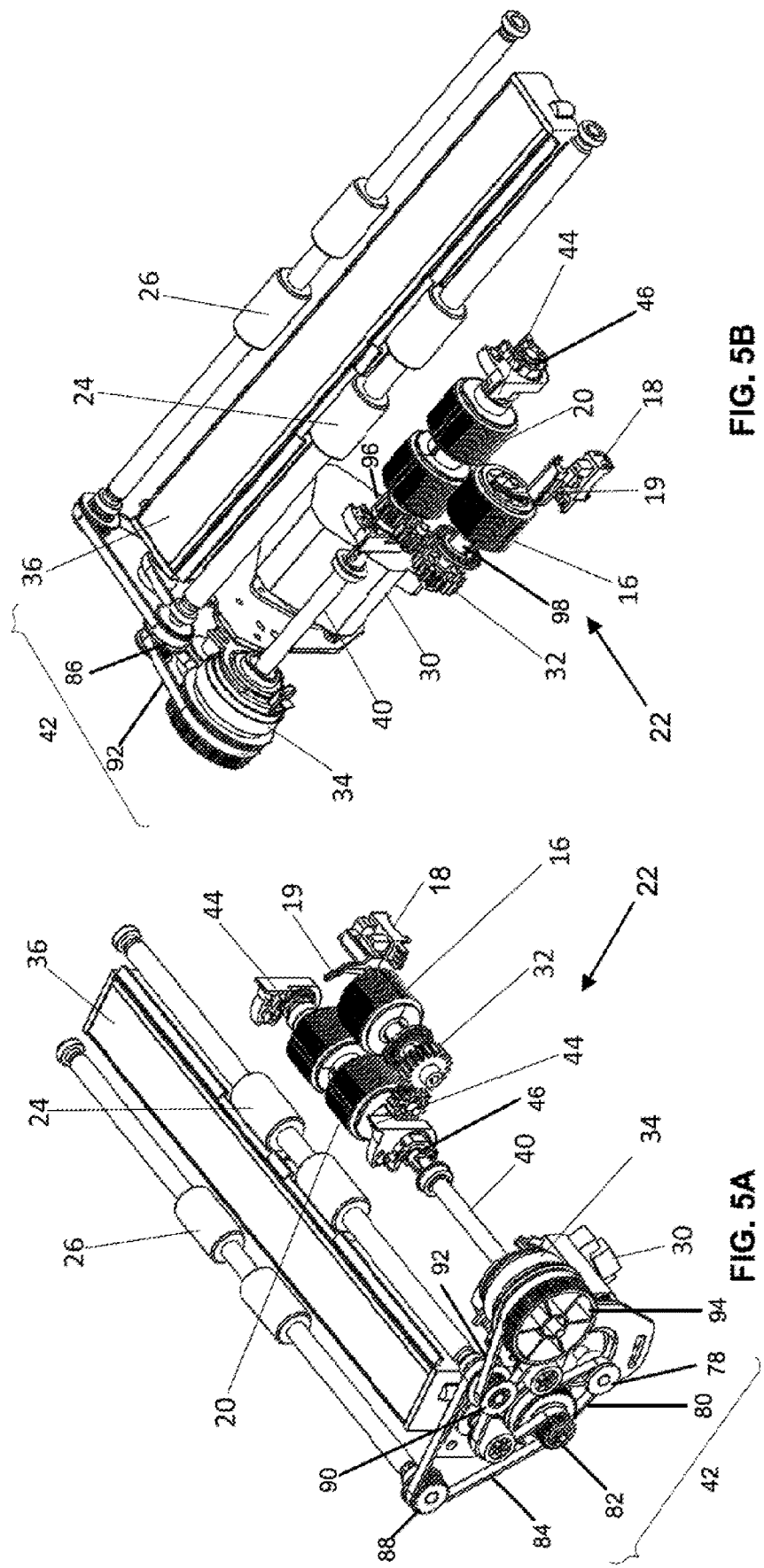

DOCUMENT SCANNER WITH AUTOMATED DOCUMENT ALIGNMENT SYSTEM

FIELD OF THE INVENTION

The present invention relates to document scanner technology, and in particular to a system and method for automatically aligning the lead edges of a document stack after the stack is loaded into a scanner.

BACKGROUND

Document scanners typically operate by separating pages from a stack of documents in order and transporting the pages past an imaging device to capture the content on the face of the page. Generally there are two types of document scanners currently available on the market, top feeders and bottom feeders. A top feeder scanner feeds documents one at a time off the top of a document stack to be scanned in order. A bottom feeder scanner feeds from the bottom of a document stack in order. Current scanners also include an input tray to hold a stack of input documents to be scanned. Many bottom feed scanners include two feeder gate stops that provide alignment of the document stack when the stack is placed into the input tray of the scanner. Upon activating the scanner, the feeder gate stops move out of the way of the documents being fed until the last document in the stack is fed into the document scanner. Then the feeder gate stops are repositioned for the next document stack to be loaded.

Both top feeder and bottom feeder scanners require that the document stack to be scanned are prepared in such a way that their lead edges are aligned prior to loading to ensure proper feeding and document separation before scanning. If the lead edges of the documents in the document stacks are not aligned within a reasonable distance (for example, under 0.5"), the documents may not separate properly or may not be separated in their proper order. This can cause the scanner multiple problems such as failing to scan certain documents, scanning documents in an incorrect order, scanning incorrect portions of documents, and/or causing document jams in the document scanner. For example, if the lead edges of the document stack are not aligned, the feeder mechanism that separates the top or bottom sheet from the document stack may separate a sheet that is not on the top or bottom of the document stack. Additionally, several sheets may be selected at the same time causing a document jam or creating overlapping sheets of documents during scanning.

Many scanners provide an angled gravity assist input tray and a feeder gate stop device to properly position the stack of documents before they are fed into the scanner. However, there is no means provided to better align the lead edges of the individual documents within the stack prior to the documents being fed into a separation mechanism, after the stack of document is loaded. Some documents are difficult to align due to the large amount of static between the documents and forcing users to properly align all the documents in a stack before inputting into the machine can be onerous and time-consuming. For example, very thin documents in large stacks can be difficult to align. Additionally, an aligned stack of documents may become misaligned during the placing of the stack of documents into an input tray of a scanner before scanning begins. Accordingly, the user may have to realign the documents, further delaying the scanning process.

Typically, the only way to prevent problems with improperly aligned document stacks has been to align the lead edges of the documents within the stack prior to loading into the scanner. However, this has numerous drawbacks. Manually aligning the lead edge of a document stack to be scanned can be time consuming and difficult in some cases, especially for light weight documents with high coefficients of friction or static charges between the documents. In addition, documents of different types and sizes within a stack can be difficult to pre-align manually. These problems with manual alignment are magnified further when dealing with high volume scanning of large numbers of documents.

Traditionally, document alignment is performed using a standalone "jogger" device. The document stack is loaded into the standalone jogger, which shakes the stack under a high frequency and small amplitude. This "jogs" the stack, causing a vibration in the document stack against the wall of the jogger, resulting in alignment of the lead edges. There are a number of problems with using such devices. For example, the document stack must be manually loaded and unloaded from the standalone jogger, which takes additional time. Further, after the device is finished, the stack must still be manually transported to the document scanner, during which time the lead edges of the documents may become misaligned. In addition, these standalone devices themselves are expensive, noisy, and take up additional office space.

Accordingly, there is a need for a low cost automated document alignment system that may be incorporated into a scanner.

SUMMARY

Embodiments are directed to a system and method for automated alignment of the lead edges of a document stack after it is loaded into the input tray of a document scanner. In particular, the systems and methods align the lead edges of the documents by the forward and backward oscillation of feeder gate stops, causing the documents to align their lead edges against the feeder gate stops.

Stacks of documents are typically entered into a document scanner by loading them onto an input tray on the scanner. Typically, a bottom feed document scanner has two feeder gate stops protruding perpendicularly to the document feed direction to place the document stack against during loading. Upon activating the document scanner, these feeder gate stops are driven forward in the document feed direction such that they no longer obstruct the path of the document stack to allow documents to be fed one at a time. Once the final document in the stack has been fed, the feeder gate stops are driven backwards such that they return to their original perpendicular position to accept a new document stack. As noted above, failure to pre-align the lead edges of the document stack before loading the stack into the input tray can cause documents to not scan, scan incorrectly, create document jams in the scanner, and other problems. The system and method described herein provide for automated alignment of the lead edges of the document stack after it has been loaded into the input tray of the document scanner. This eliminates the need to pre-align the lead edges of the document stack prior to loading, leading to faster and better quality scanning.

Embodiments include an automated jogger apparatus that oscillate the feeder gate stops forwards and backwards relative to the direction that the documents are fed into the scanner. This repeated oscillation shakes the document stack, causing the documents within to slide relative to each other such that their lead edges align against the feeder gate stops. When the oscillation ends after a number of cycles, the feeder gate stops are driven forwards out of the way of the document transport path, so the now aligned document stack can be fed into the document scanner via the feed roller and urging roller.

In one embodiment of the invention, feeder gate elements are pivotally mounted onto the same drive shaft as a bottom feed roller. This eliminates the need for additional devices such as a motor, cylinder, or solenoid to drive the feeder gate stops, and minimizes the costs of implementing the automated jogger techniques.

In another embodiment of the invention, the ability to set programmable parameters related to the oscillation is provided. These may be adjusted manually by the user, or be selected from a set of preset configurations, such as for different types of document material or different numbers of documents within a stack.

BRIEF DESCRIPTION OF THE DRAWINGS

Various embodiments in accordance with the present disclosure will be described with reference to the drawings, in which:

FIGS. 5A-5B illustrate two different views of a scanner transport drive of an example scanner system, in accordance with an embodiment;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments are directed to systems, methods, and apparatuses for a document scanner with an automated document alignment system to automatically align the lead edges of a stack of documents prior to scanning. This may be accomplished by having a document scanner with one or more feeder gate components (also referred to as feeder gate stops or feeder gate elements) configured to repeatedly oscillate forward and backward relative to the direction the documents are fed into the scanner. This enables the documents within a document stack to slide against on another such that their lead edges align against the feeder gate stops.

Figure 1B:
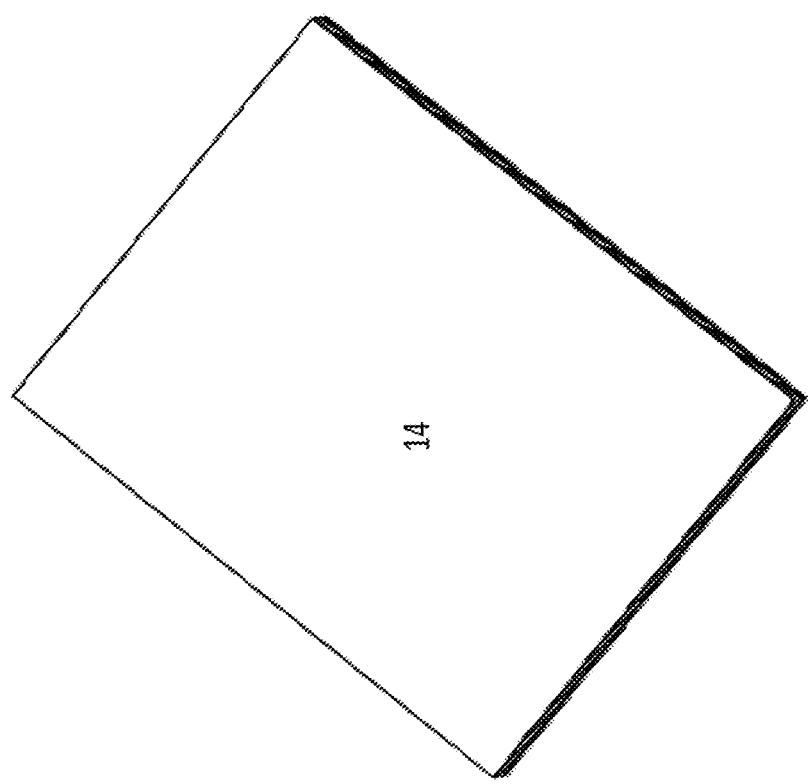
FIGS. 1A and 1B illustrate an unaligned stack of documents and an aligned stack of documents respectively.
Figure 1A:
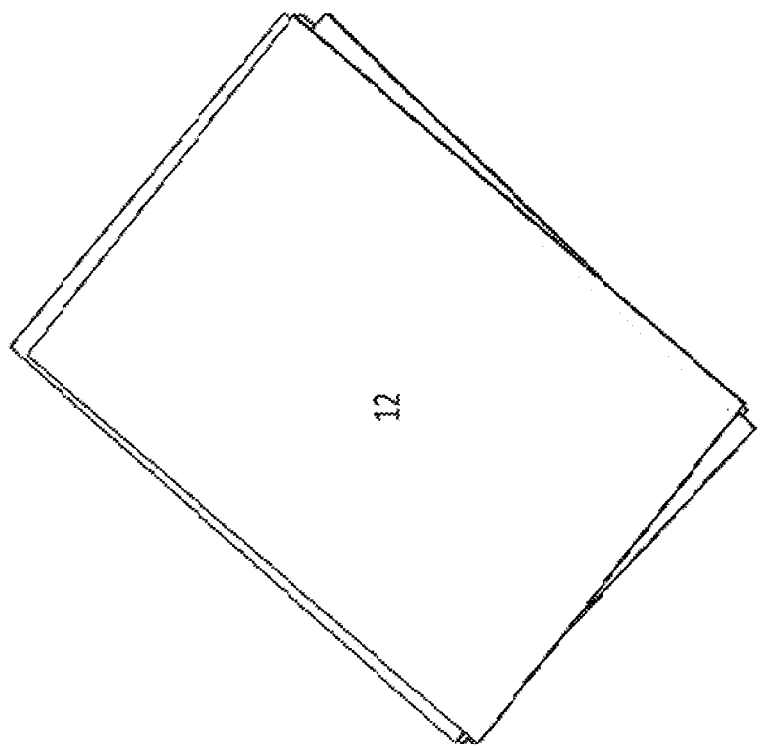

For example, FIG. 1A shows an unaligned document stack 12 where the lead edges of the documents within the document stack are not aligned along a vertical plane. Instead, the lead edges of the various documents in the document stack overlap with one another and do not create a uniform lead edge surface across each of the documents. Accordingly, a separation mechanism that separates the documents using the lead edges of each document in the document stack may separate the wrong document from the document stack, may separate multiple documents at the same time, and/or may not feed a document uniformly into the scanner transport path. Thus, the order that the documents are scanned in may be incorrect or a document jam may occur due to multiple documents being fed at the same time.

In contrast, FIG. 1B shows an aligned document stack 14 where the lead edge of each of the documents within the document stack are aligned along a vertical plane at the front of the document stack. As such, there is no document surface extending from the document stack for a separation mechanism to mistakenly separate the wrong document in the stack and/or to separate multiple documents at the same time.

When the automated jogger system is activated the feeder gate elements will oscillate by being driven forwards and backwards one or more times, shaking the input document stack. The oscillation, which may also be referred to as jogging or shuffling, results in the documents shifting their alignment and position in the stack. The documents slide between each other, causing them to move and rotate towards the feeder gate elements, aligning their lead edges together within a reasonable distance. The oscillation of the feeder gate elements ends after a number of cycles or predetermined time, at which point the feeder gate elements may be driven forwards into a retracted position that is out of the way of the document transport path so the now aligned document stack can be fed into the document scanner via a feed roller and urging roller.

In some embodiments of this invention, the feeder gate elements are pivotally mounted on a feed roller drive shaft. The contact surfaces of the feeder gate elements are initially positioned perpendicular to the document feed direction. The documents to be scanned are loaded on the input tray near or against the feeder gate elements. When the automated jogger system is activated the shaft rotates to drive the feeder gate elements forward by a predetermined angle, and then rotates in the opposite direction to drive the feeder gate elements backwards to their original position or an alternate position (e.g., an intermediate position with a smaller angle of rotation than returning to the original position), with each cycle occurring at a predetermined rate. During this oscillation, the documents within the stack move and rotate towards the contact surface of the feeder gate elements and align their leading edges. After a predetermined amount of time or number of cycles, this oscillation is stopped and the feeder gate elements are driven out of the way to allow the documents to be fed into the document separation device. This embodiment does not require an additional device such as a motor, cylinder, or solenoid to drive the feeder gate elements, and provides a low cost embodiment of the invention.

Embodiments of the present invention ensure that an unaligned document stack 12 that is input into a scanner system are converted into an aligned document stack 14 before scanning any of the documents. Accordingly, by ensuring that each of the documents in the document stack are aligned, embodiments improve the scanners performance and reduce the document preparation demands on the operator. Further, cycle time can be increased by not requiring an operator to spend the time to align the documents before processing. Additionally, embodiments avoid the re-stacking and re-scanning of entire sets of documents when scanned out of order and minimize delays and operator maintenance caused by document jams. As such, embodiments improve cycle time, throughput, and ease of use of the scanner system.

Figure 2:
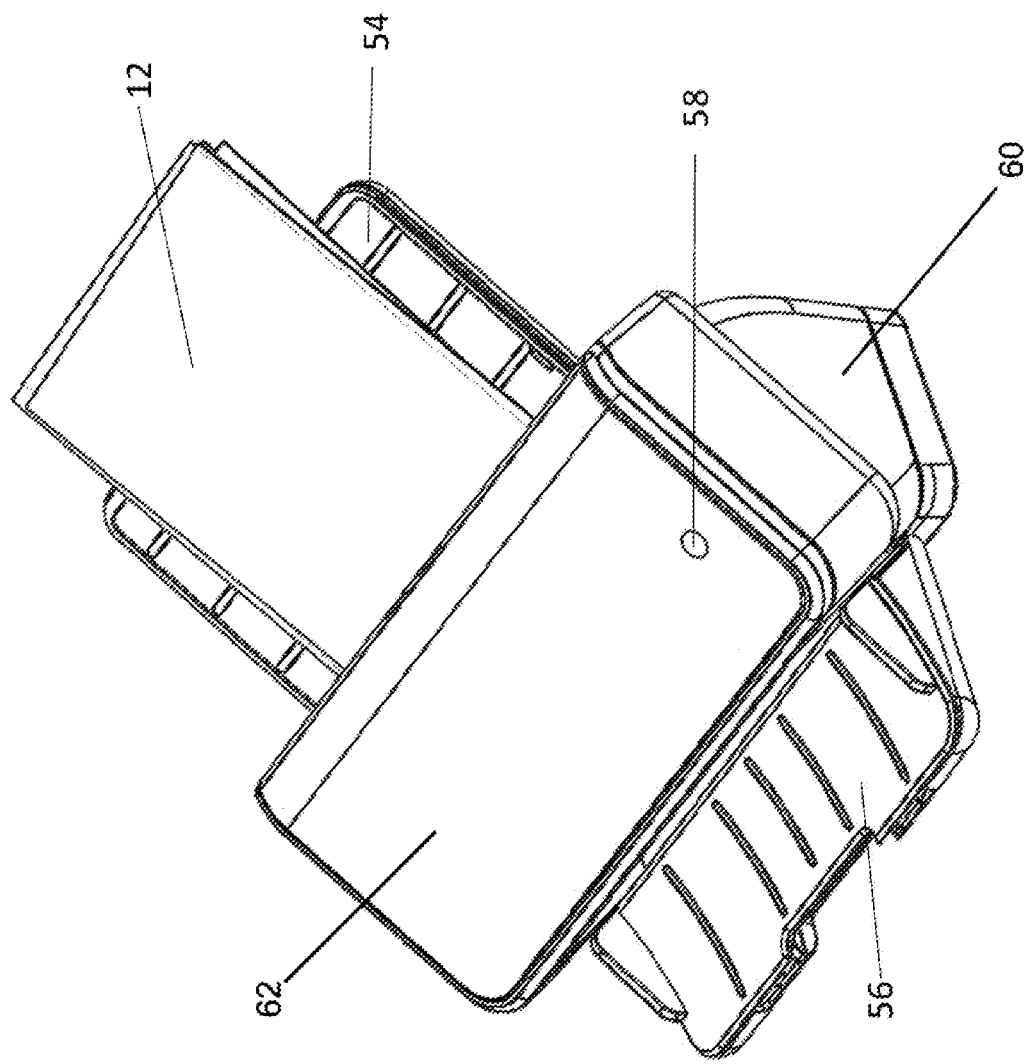
FIG. 2 illustrates an example perspective view of a scanner system, in accordance with an embodiment.

FIG. 2 illustrates a perspective view of an example scanner system 10 according to embodiments of the present invention. The scanner system 10 includes an input tray 54, an output tray 56, a scan button 58, an upper frame body 62, and a base frame body 60. An unaligned document stack 12 may be inserted onto the input tray 54. The input tray 54 may be configured to hold a stack of documents 12 to be scanned. The input tray 54 may be tilted at an angle such that the lead edges of the document stack 12 are lower than the trailing edges of the document stack 12 and gravity assists the stack 12 to move downward to the feeder gate elements (not shown) within the base frame body 60. Each document within the document stack 12 may be fed along a transport path (not shown) through an imaging device (not shown) within the base frame body 60 of the scanner system 10 to scan each of the documents. Once scanned, each of the documents may exit along the transport path and be stacked in the output tray 56 in the order that they are scanned. Appendix A, which is incorporated by reference in its entirety for all purposes, includes a parts list identifying the elements shown in FIGS. 2-10.

Note that the scanner system of FIG. 2 is only one example of the type of systems that can incorporate automated jogger systems as described herein. For example, the techniques described herein could be applied to any systems that rely on aligned documents for processing. For example, stapling machines, hole-punching machines, envelope stuffing machines, and/or any other systems that may use aligned documents may incorporate the techniques described herein. Further, note that the present embodiments focus on bottom-feed types of desktop scanner systems. However, top-feeder and/or other configurations of scanner systems may use the techniques described herein to align documents prior to scanning, as one of ordinary skill would recognize.

Figure 3:
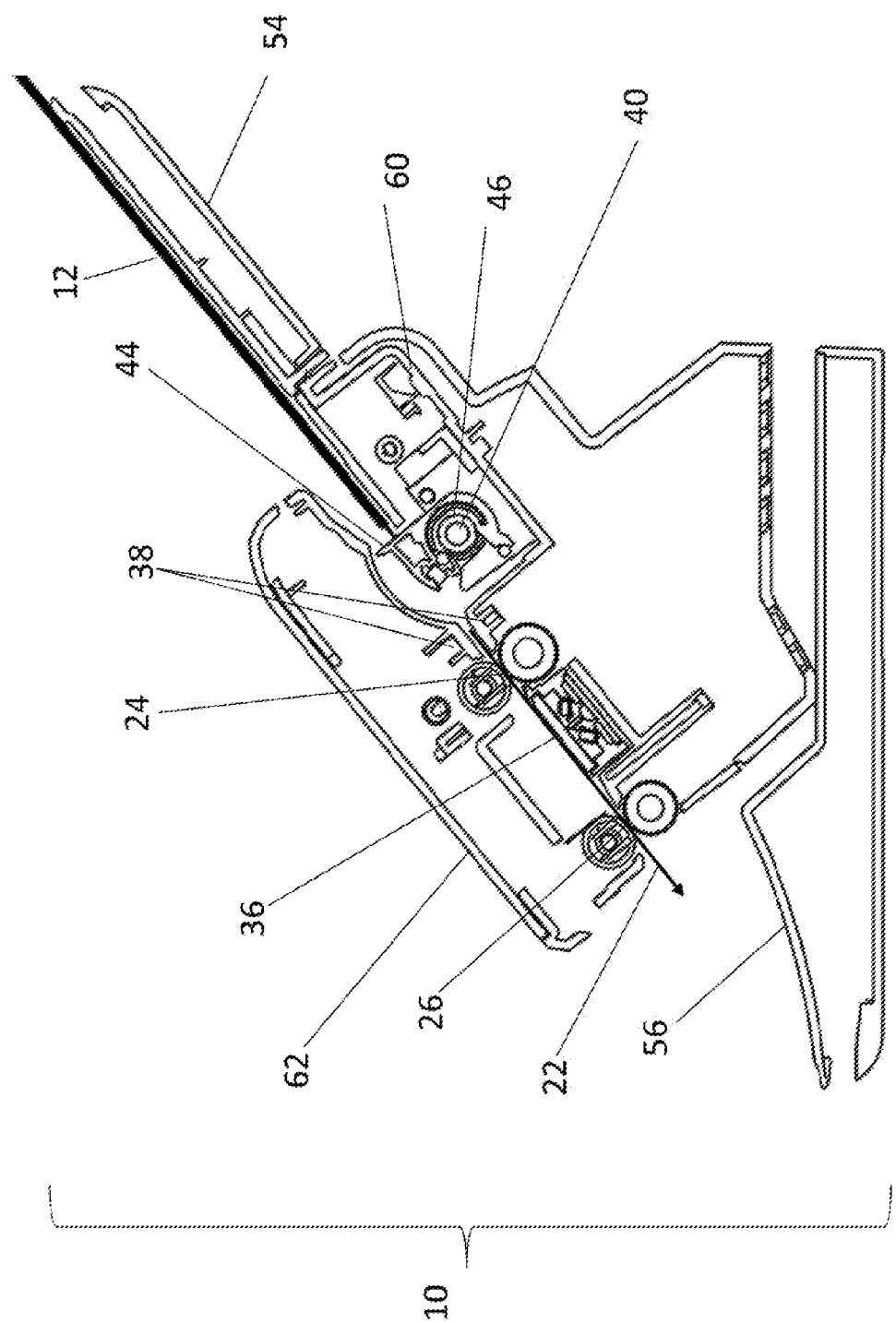
FIG. 3 illustrates an example partial cross-section view of a scanner system, in accordance with an embodiment.

FIG. 3 illustrates an example partial cross-section view of a scanner system 10, in accordance with an embodiment. FIG. 3 shows an exemplary embodiment of an automated document alignment system that is incorporated into a bottom feed document scanner system 10. The scanner system 10 includes the input tray 54 that is coupled to a base frame body 60. The base frame body 60 is coupled to an upper frame body 62 which can be moved to access components within the base frame body 60. The base frame body 60 is coupled to an output tray 56 that is configured to hold the scanned documents once each document has been scanned.

The input tray 54 is configured to hold the document stack such that the lead edges of the documents within the document stack engage with an automated document alignment mechanism (also referred to as a "jogger" system). The automated jogger mechanism may include one or more feeder gate elements (also referred to as a "feeder gate stops") that may be configured to engage the lead edges of a stack of documents in an initial position before scanning begins. The feeder gate elements 44 may extend radially/upward into the path of the documents such that the feeder gate elements 44 constrict the movement of the documents into one or more rollers configured to feed the documents into a transport path 22 of the scanner system 10. In some embodiments, the feeder gate elements 44 may be coupled to a feed roller drive shaft 40 and may extend radially/upward from one or more apertures in the base frame 60 to create a barrier to the further movement of the documents into the scanner system 10. The feeder gate elements 44 may be coupled to the feed roller drive shaft 40 using one-way bearings 46 to ensure the proper movement of the feeder gate elements 44 during operation of the transport drive. Thus, the feeder gate elements 44 may be rotatable such that the feeder gate elements 44 may constrict the movement of the documents in the document stack in an initial blocking position, may articulate over an angle of rotation to oscillate the feeder gate elements 44 to align the documents in the document stack, and may retract into the base frame body 60 in a retracted position to clear a transport path 22 for the documents to travel for scanning. Additional details of the jogger mechanism are provided in FIGS. 7-9 below. Note that embodiments discussed below incorporate two separate feeder gate elements 44. However, in some embodiments, any number of separate or integrated feeder gate elements 44 could be implemented.

Separation devices (not shown) may be positioned behind or in-line with the feeder gate elements 44 that are configured to separate a document from the stack of documents upon retraction of the feeder gate elements 44. The separation devices may include any component configured to separate a document from the document stack. The separation devices may be bottom-feeding or top-feeding such that the top or bottom sheet of the stack of documents is separated by the separation devices. Each of the document separation devices may include a separation pad, a separation roller, a retard roller, or other device capable of separating a stack of documents into individual sheets. Accordingly, once the feeder gate elements 44 are retracted, the lead edges of the documents in the document stack are pushed to one or more separation devices that separate a single document from the stack of documents.

The separation device may separate a document from the stack of documents and feed the document into a transport drive. The transport drive is configured to move the document from the separation device over an imaging device 36 and out of the scanner device along a transport path 22. The transport drive may include one or more feed roller assemblies configured to move the document along the transport path 22. For example, the transport drive shown in FIG. 3 includes a first transport roller assembly 24 and an exit transport roller assembly 26 that are configured to push a document between a set of rollers positioned at the start and end of the transport path 22. The set of rollers create a "nip" or pinched area that creates enough force on the document to move the document in the direction of rotation. The first transport roller assembly 24 and the exit transport roller assembly 26 displace a separated document from the document stack over a camera 36 at a constant rate to capture an image of the information on the document.

The imaging device may include a camera 36 or any other device configured to capture the contents of the document. Document edge sensors 38 may be used to identify lead edges and rear edges of documents as each document passes through the transport path 22. The document edge sensor 38 may be used to engage and disengage a drive clutch for moving the transport drive that will be described in further detail below. Additionally, a processor may use the information received form the document edge sensors 38 to distinguish different documents that are captured by the imaging device and to identify when scanning of each of the documents in a document stack is complete.

Figure 4A:
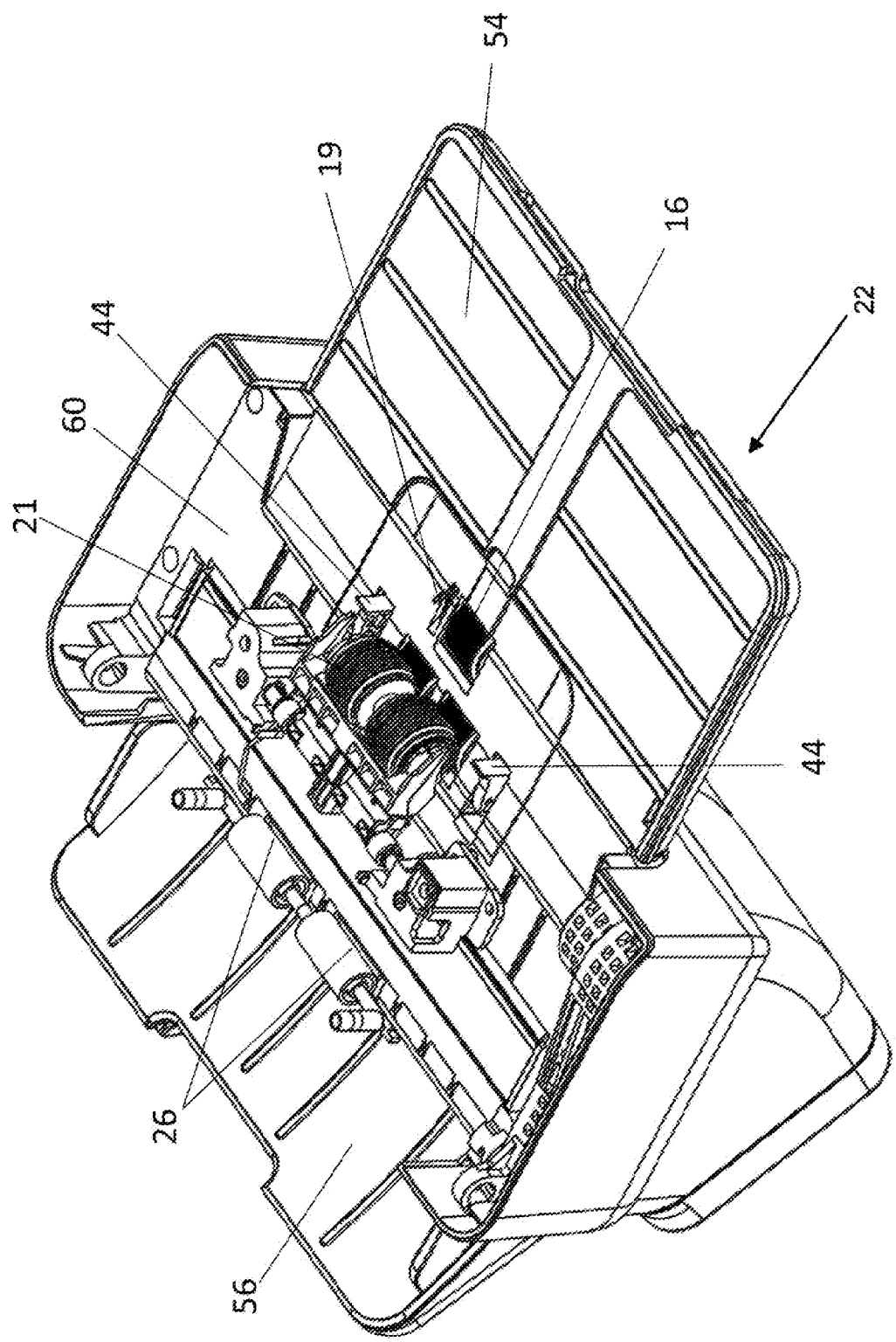
FIGS. 4A-4B illustrate an alternate perspective view of an example scanner system with an upper frame body 62 removed with and without a stack of documents inserted, in accordance with an embodiment.
Figure 4B:
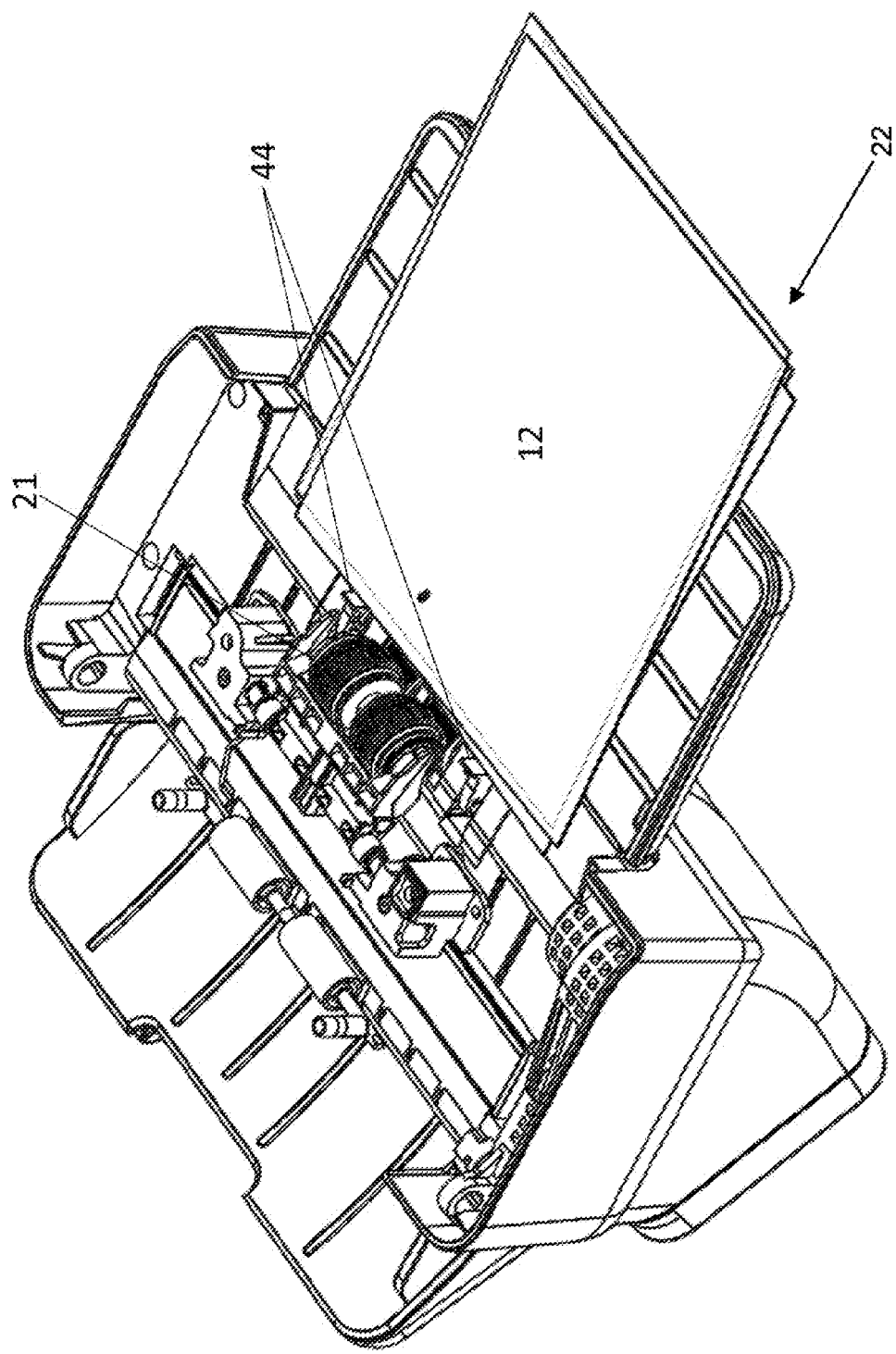

FIGS. 4A-4B show an alternate perspective view of an example scanner system 10 with the upper frame body 62 removed such that the separation devices 21, feeder gate elements 44, and exit transport roller assembly 26 are shown. As can be seen in FIG. 4A, the scanner system 10 includes an urging roller 16, a document present sensor arm 19, a separation device 21, feed rollers 20, a first transport roller assembly 24, an exit transport roller assembly 26, and the feeder gate elements 44 in an initial blocking position.

The document present sensor arm 19 may be coupled to a document present sensor (not shown) that indicates to one or more controllers (e.g., a motion controller) of the scanner system 10 that a document stack is loaded into the input tray 54. The document present sensor arm 19 may be forced down into the base frame body 60 by the weight of the document stack to indicate that a document stack is present in the input tray 54. For example, as shown in FIG. 4B where a document stack is inserted into the input tray 54, the document stack pushes against the extended portion of the document present sensor arm 19 to rotate the document present sensor arm 19 into the base frame body 60. A document present sensor (element 18 in FIGS. 5A-5B) may be configured to identify when documents are present by determining when enough weight is applied to the document present sensor arm 19 such that the arm rotates a predetermined distance to indicate that one or more documents are present.

In some embodiments, the document present sensor arm 19 may be weighted with a predetermined amount of resistance in order to allow the document present sensor 18 to determine a weight of the document stack. The weight may allow the document present sensor 18 to identify a number of documents within a stack and/or a material that the documents within the document stack are made from. In some embodiments, the material of the documents, length of the documents, width of the documents, and/or the number of documents in a stack may be used to select oscillation parameters for aligning the document stack. For example, a number of oscillations, an angle of rotation for each articulation of the feeder gate element 44, and/or a velocity of the rotation of the feeder gate element 44 may be determined according to the sensor information received by the document present sensor 18.

The feeder gate elements 44 may be configured to block the movement of documents into the separation device 21 in an initial blocking position. In the initial blocking position, the feeder gate elements 44 may extend vertically out of apertures within the base frame body 60 to block the path of the documents into the separation device 21. In some embodiments, the aperture may be in the form of a slot that is designed to constrain the rear movement of the feeder gate element 44 such that an extended document contact surface 66 of the feeder gate element 44 is perpendicular to the surface of the input tray 54 when in the initial blocking position. The slot may be long enough that the feeder gate element 44 may be retracted into the base frame body 60 to clear a path to the separation device 21 when in a retracted position. Accordingly, the feeder gate element 44 may be free to rotate at least 90 degrees to move from a perpendicular position to a parallel position in relation to the surface of the input tray 54. In some embodiments, the feeder gate element 44 may be configured to rotate more than 90 degrees when retracted and may be locked into a retracted position within the base frame body 60. Additional details regarding the operation and rotation of the feeder gate elements 44 may be provided in relation to FIGS. 7-9 below.

The urging roller 16 may be configured to push the document stack into the separation device 21 to assist the separation device 21 in separating a document from the document stack. The urging roller 16 may be coupled to the transport drive such that the urging roller 16 may work in unison with the feed roller 20, first transport roller assembly 24, and exit transport roller assembly 26 to move documents through the scanner system 10 along a transport path 22.

FIGS. 5A-5B illustrate two different views of a scanner transport drive of an example scanner system 10, in accordance with an embodiment. The scanner transport drive may include the first transport rollers 24, the exit transport rollers 26, the feeder roller 20, the urging roller 16, and the feeder gate elements 44. In this embodiment, the first transport rollers 24, exit transport rollers 26, feeder roller 20, urging roller 16, and feeder gate 44 are all driven by the motor 30 using a motor drive arrangement 42.

The motor drive arrangement 42 consists of the motor 30 which is fixedly mounted to a portion of the base frame body 60. The motor 30 has a pulley 78 at its shaft end which drives a first timing belt 80. The first timing belt 80 in turn drives a pivotally mounted pulley cluster 82 which is also supported by the base frame body 60. The pulley cluster 82 drives a second timing belt 84. The second timing belt 84 drives the first transport rollers 24 and the exit transport rollers 26 at the same speed via attached end pulleys 86, 88. The first transport roller assembly 24 also has a pulley cluster 90. The pulley cluster 90 of the first transport roller assembly 24 drives a third timing belt 92. The third timing belt 92 drives a clutch pulley 94 which is pivotally mounted to the feeder drive shaft 40. The clutch pulley 94 has physical features that engage the clutch 34. When the clutch 34 is engaged and energized, the clutch pulley 94 drives the feeder drive shaft 40.

The feeder drive shaft 40 is also pivotally mounted to the base frame 60. The feeder drive shaft 40 supports two one-way bearings 46. These two one-way bearings 46 support the feeder gate elements 44. The feeder drive shaft 40 also supports the feed roller 20 via bearings and a one-way bearing 46. In addition, the feeder drive shaft 40 supports a gear 96 which drives a gear arrangement 32. The gear arrangement 32 drives an urging roller shaft 98. The urging roller shaft 98 is pivotally mounted to the base frame 60. The urging roller 16 is supported by a one-way bearing 46 (shown in FIG. 5B) which is driven by the urging roller shaft 98.

When the clutch 34 is engaged the motor 30 can drive the feeder gate 44 forward or backwards in relation to the transport path 22, through the friction or interlocking of the one-way bearings 46 which support the feeder gate elements 44. Accordingly, the motor 30 may drive the oscillation of the feeder gate elements 44 in a forward and backward direction in relation to the transport path 22 of the document.

The motor 30 may be driven in a forward and backward direction according to the oscillation parameters based on the type of material of the document and/or the number of documents.

After a leading edge of a document enters the first transport roller 24 nip, the clutch 34 can be disengaged. With the clutch 34 disengaged, the document trailing end can pull the feed roller 20 and urging roller 16 nips in the free rotational direction of their associated one-way bearings 46. Accordingly, the clutch 34 may be engaged to activate the urging roller 16 and the feed roller 20 to push a document stack into the separation device 21 and a separated document into the first transport roller apparatus 24. Once the separated document enters the first transport roller 24 nip, the clutch 34 can be disengaged and the urging roller 16 and the feed roller 20 may stop pushing the document in the transport path 22. Instead, the first transport roller 24 and the exit transport roller 26 nips may move the document along the transport path 22.

Figure 6B:
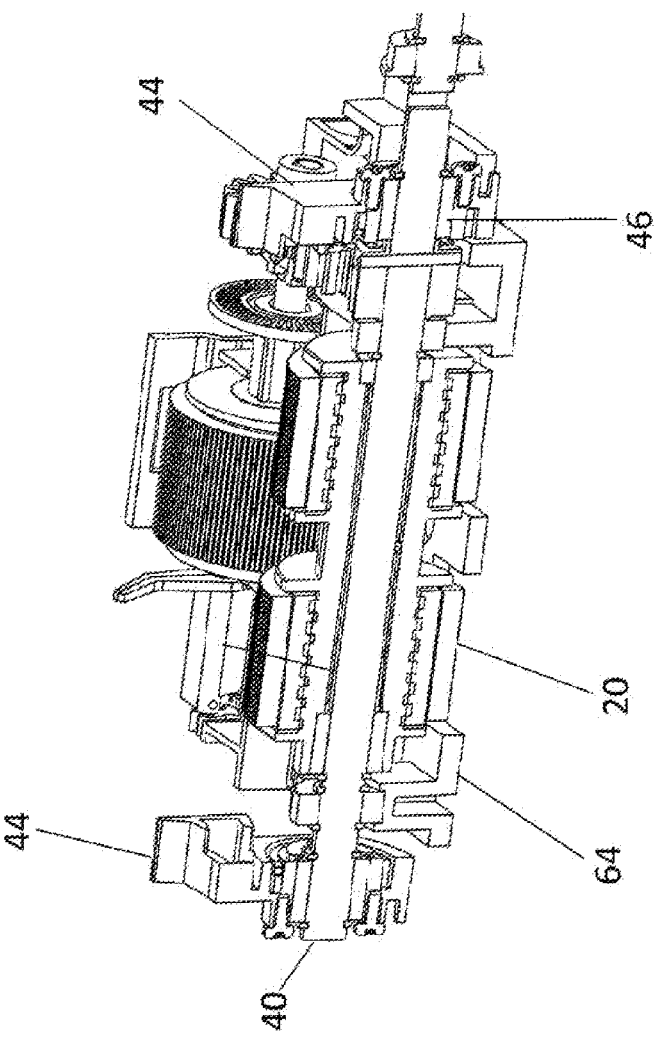
FIGS. 6A-6B illustrate two different views of a feed roller and gate area of a scanner transport drive of an example scanner system, in accordance with an embodiment.
Figure 6A:
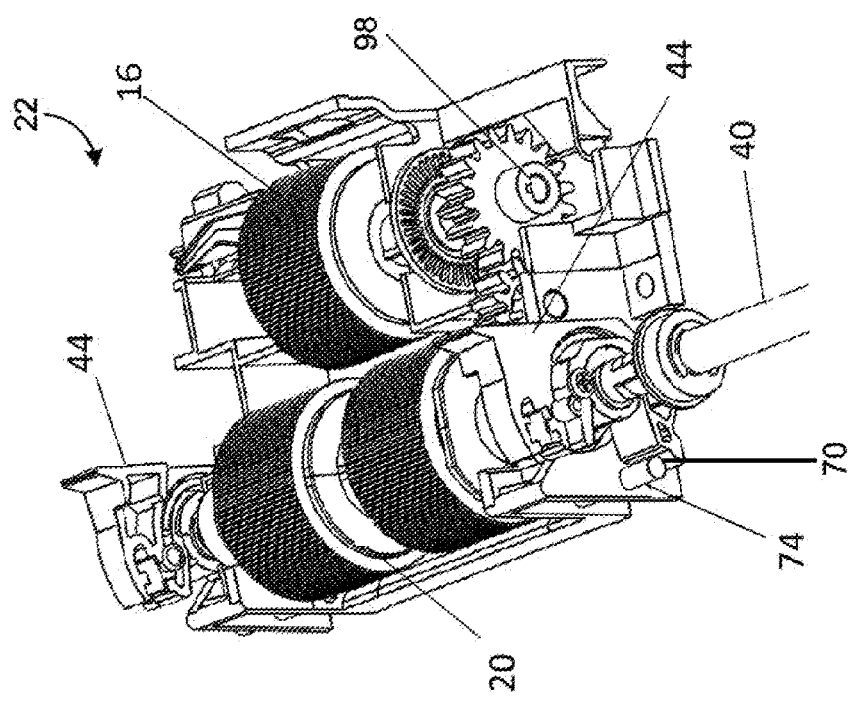

FIGS. 6A-6B illustrate two different views of a feed roller 20 and feeder gate area of a scanner transport drive of an example scanner system 10, in accordance with an embodiment. The feeder gate elements 44 are coupled to the feed roller drive shaft 40 via a one-way bearing 46 that allows the feeder gate element 44 to rotate backwards (in relation to the transport path 22). Accordingly, the feeder gate elements 44 are mounted onto one-way bearings 46 that ride on the feeder shaft. The feeder gate elements 44 are driven backwards (in relation to the transport path 22) but are allowed to free-wheel in the forward direction when the feed roller drive shaft 40 is rotating in the forward direction. As such, when the feed roller drive shaft 40 is rotating in the backward direction (in relation to the transport path 22), the feeder gates are driven backwards, but when the feed roller drive shaft 40 is rotating in the forward direction, the one-way bearing 46 is not engaged and only friction, gravity, and weight from engaged documents cause the feeder gate elements 44 to move in the forward direction along the document transport path 22.

The feeder frame 64 may include a feeder frame stop 74 that is configured to engage with a lower portion of the feeder gate element 44 to constrain the rotational movement of the feeder gate element 44 during articulation of the feeder gate element 44. For example, as shown in FIG. 6A, the feeder frame stop 74 may have the shape of a pin or post that extends axially along a feeder drive shaft from the feeder frame 64. Alternatively and/or additionally, the feeder frame stop 74 may include any other physical element shape configured to constrict the movement of the feeder gate element 44. The feeder frame stop 74 may extend far enough axially into the path of the feeder gate element body 44 to interfere with the free movement of the bottom portion of the feeder gate element body 44 (also referred to as a gate up position stop 70). Thus, the feeder frame stop 74 may constrain the movement of the feeder gate element 44 in a backward or rearward direction with respect to the transport path 22 of the documents through the scanning system 10. The position of the feeder frame stop 74 may be designed to constrain the movement of the feeder gate element 44 such that an extended portion of the feeder gate element 44 is in a substantially perpendicular position to the surface of the base frame body 60 and/or the surface of the input tray 54. Accordingly, the feeder frame stop 74 may set a blocking position of the feeder gate elements 44.

Figure 7C:
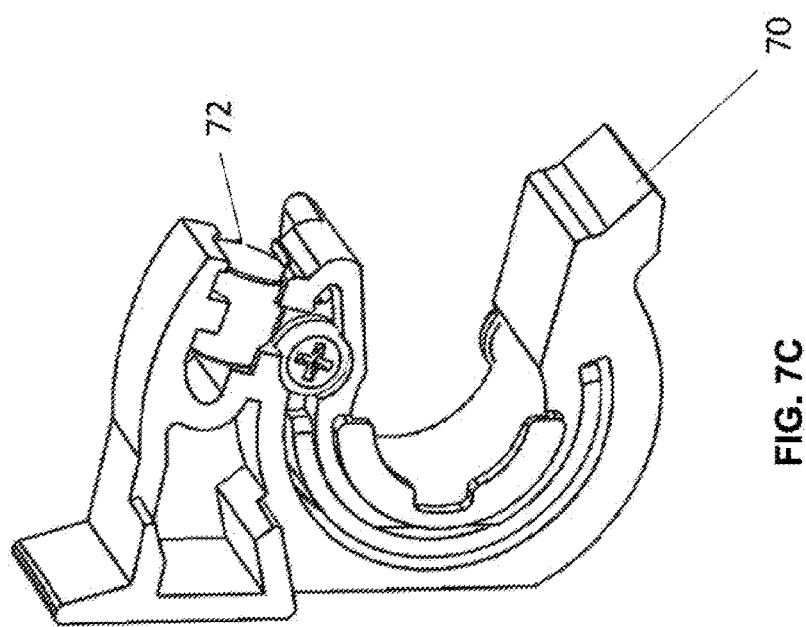
FIGS. 7A-7C illustrate three different views of an uncoupled feeder gate component of an example scanner system, in accordance with various embodiments.
Figure 7B:
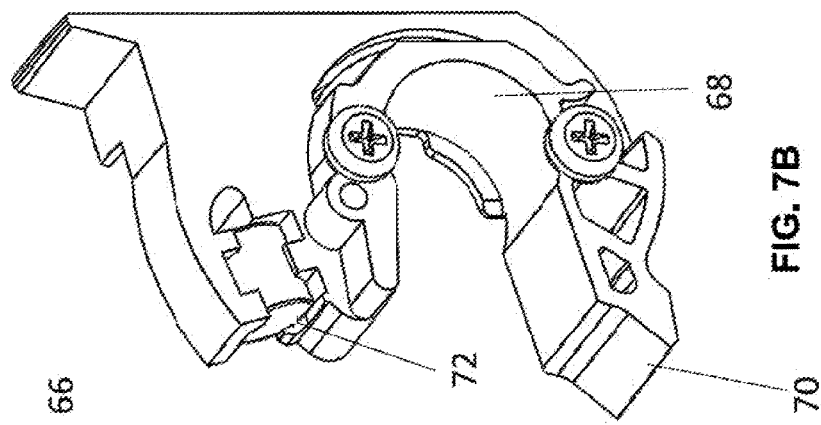
Figure 7A:
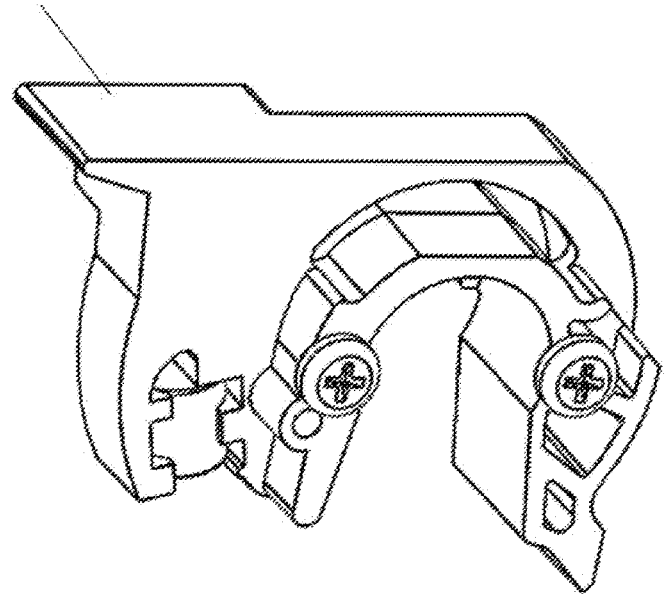

FIGS. 7A-7C illustrate three different views of an uncoupled feeder gate element 44 of an example scanner system 10, in accordance with various embodiments. The feeder gate element 44 includes a document contact surface 66, a gate down position stop 72, a gate up position stop 70, and a gate bore 68. The gate bore 68 is configured to mount to the one-way bearing 46 to rotate the feeder gate element 44 when the one-way bearing 46 is engaged. The document contact surface 66 is configured to extend out of the base frame slot and contact the lead edges of the documents in the document stack. The document contact surface 66 may include any suitable design including a flat vertical surface. In some embodiments, the surface may be feathered or otherwise include surface features to engage with the lead edges of the documents. The document contact surface 66 may also be curved or have any other suitable design to engage with the lead edges of documents in the document stack. The document contact surface 66 may extend from the top to the bottom of the feeder gate element 44 along the rear portion (in relation to the transport path 22 of the scanner) of the feeder gate element 44. In some embodiments, the document contact surface 66 may be stepped or otherwise may have different widths in the radial direction based on the design of the base frame slot. For example, the document contact surface 66 of the feeder gate element 44 may have a stepped portion that may extend further in the radial direction once clearing the base frame surface of the scanner system 10 to contact the documents than the lower portion of the rear end of the feeder gate element 44.

On the opposite side of the bottom portion of the feeder gate element 44 from the document contact surface 66, the feeder gate element 44 may include a gate up position stop 70. The gate up position stop may be configured to engage with the feeder frame stop 74 when the feeder gate element 44 is in an "up" position, also called an initial blocking position. The gate up position stop 70 engages with the feeder frame stop 74 to constrict the rotational movement of the feeder gate element 44 to the "up" position.

On the opposite side of the top portion of the feeder gate element 44 from the document contact surface 66, the feeder gate element 44 may include a gate down position stop 72. The gate down position stop may include a magnet or other element that may engage with the feeder frame stop 74 when the feeder gate element 44 is in a "down" position, also called a retracted position. The gate down position stop may have a magnetic force that is sufficient to fight incidental movement due to vibration or other incidental forces on the drive shaft but not strong enough to hold the feeder gate element 44 forward against the backward rotation (in relation to the direction of the document transport path 22) of the drive shaft when the clutch 34 is engaged. The feed frame stop may include a metal pin that is made of a ferromagnetic material that will interact with the magnetic force from the magnet and cause the feeder gate element 44 to snap down to the metal pin. Accordingly, the gate down position stop keeps the feeder gate element 44 out of the way of the transport path 22 when the feeder gate elements 44 are not engaged, articulating, and/or oscillating to align the documents.

Figure 8C:
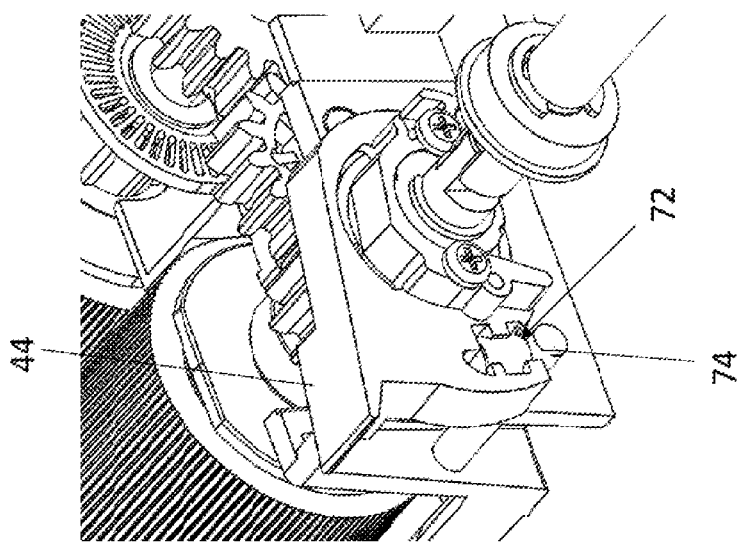
FIGS. 8A-8C illustrate a feeder gate component coupled to a feeder shaft of a transport drive of an example scanner system in three different rotational positions, in accordance with various embodiments.
Figure 8B:
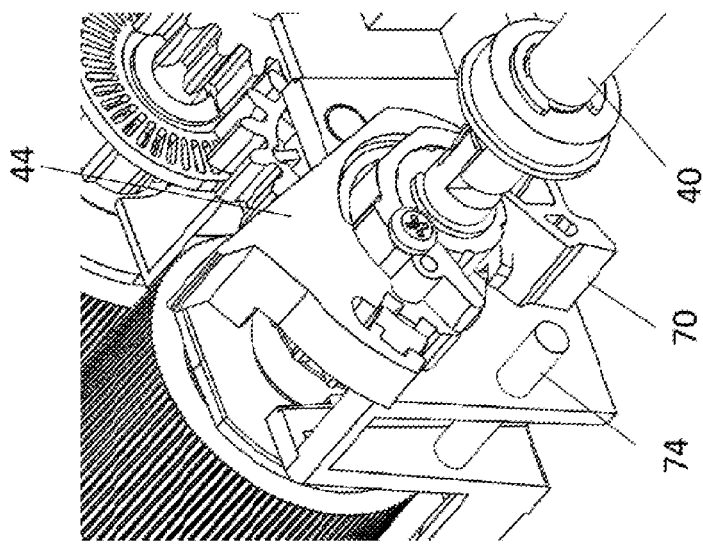
Figure 8A:
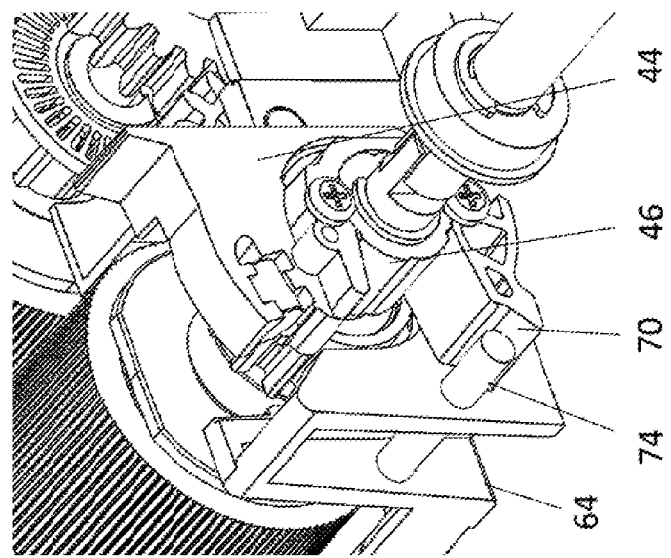

FIGS. 8A-8C illustrate a feeder gate component coupled to a feeder shaft of a transport drive of an example scanner system 10 in three different rotational positions, in accordance with various embodiments. FIG. 8A shows the feeder gate element 44 in the "up" position (also referred to as an initial blocking position). As can be seen, the feeder frame stop 74 has a pin shape extending axially from the feeder frame. The surface of the gate up position stop is shaped to engage with the pin shape of the feeder frame stop 74.

FIG. 8B shows the feeder gate element 44 in an articulating or transitory position between the up position (i.e., blocking position) and the down position (i.e., retracted position). As can be seen, neither the gate up position stop nor the gate down position stop is engaged with the feeder frame stop 74 such that the feeder gate element 44 is free to rotate.

FIG. 8C shows the feeder gate element 44 in the "down" position (also referred to as a retracted position). As can be seen, the gate down position stop 72 is physically in contact with the feeder frame stop 74. In some embodiments, a magnet may be used to create a force that attracts the gate down position stop to the feeder frame stop 74 and to keep the feeder gate element 44 snapped in the retracted position. As such, the feeder gate element 44 may remain in the retracted position until the feed roller drive shaft 40 rotates in the backward direction and the one-way bearing 46 engages and rotates the feeder gate element 44 in the backward direction in respect to the document transport path 22.

Figure 9B:
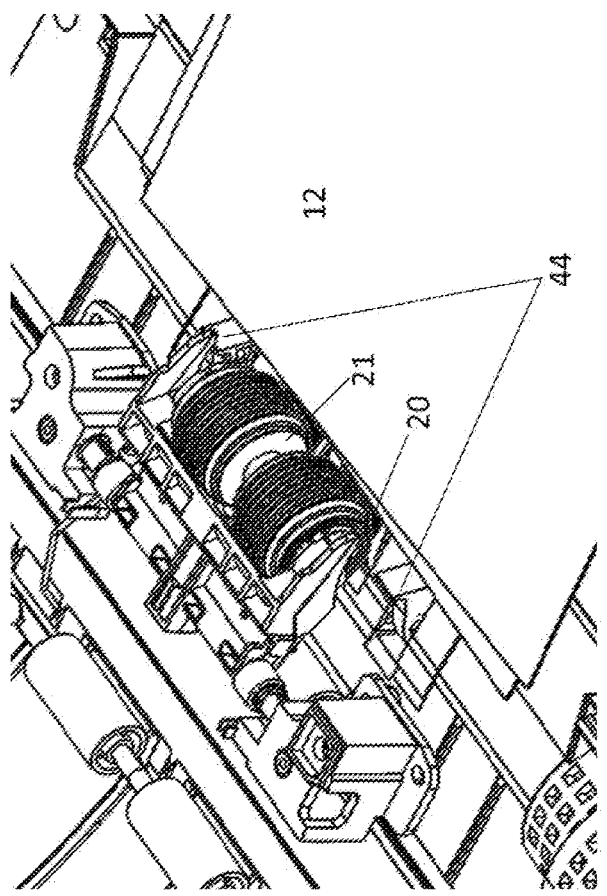
FIGS. 9A-9D illustrate a partial view of a feeder gate area of an example scanner system with the feeder gate in different rotational positions, in accordance with an embodiment.
Figure 9A:
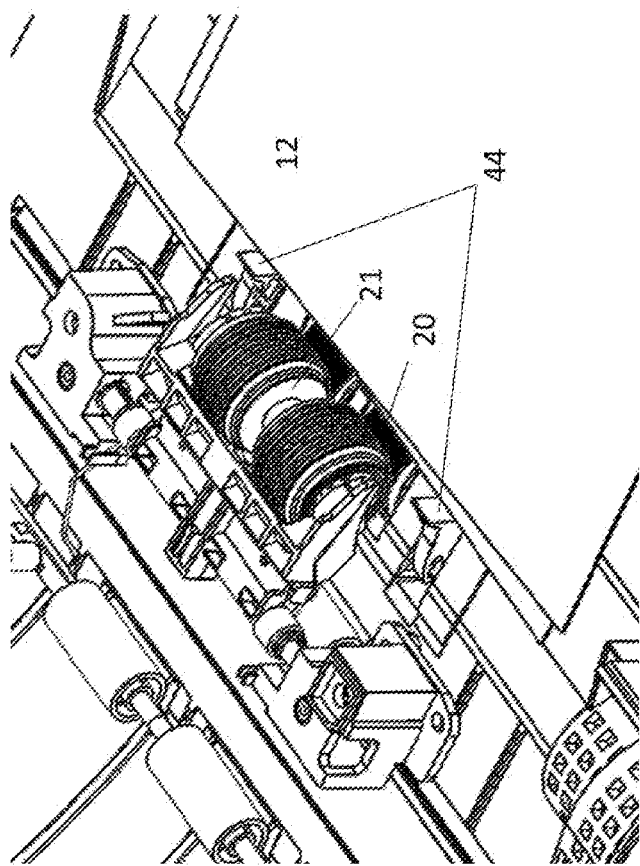
Figure 9D:
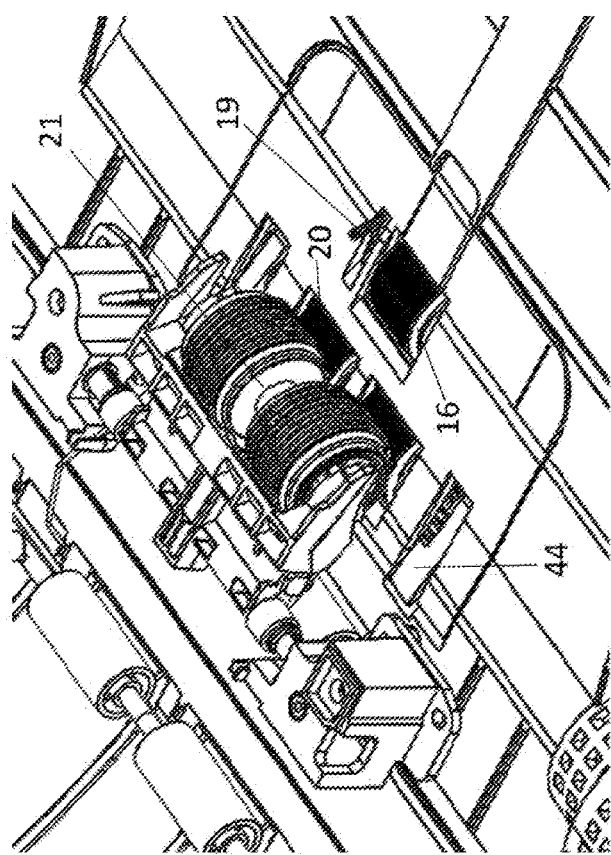
Figure 9C:
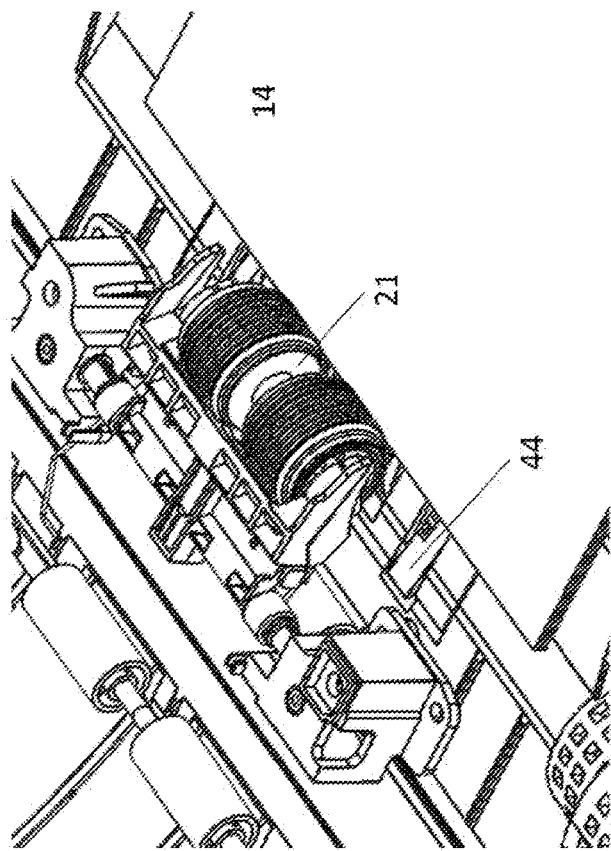

FIGS. 9A-9D illustrate a partial view of a feeder gate area of an example scanner system 10 with the feeder gate in different rotational positions, in accordance with an embodiment. The rotational positions of the feeder gate elements 44 shown in FIGS. 9A-9C correspond to the rotational positions of FIGS. 8A-8C described above, respectively. As such, in FIG. 9A, the document contact surface 66 of the feeder gate element 44 can be seen extended vertically out of the apertures in the base frame surface to contact the lead edges of the document stack 12. In FIG. 9B, the feeder gate elements 44 are shown partially rotated in a forward direction (in respect to the document transport path 22) as the feeder gate elements 44 are oscillated during an automated jogger operation to align the unaligned document stack 12. In embodiments that implement one-way bearings 46, the weight of the documents may push the feeder gate elements 44 forward when the feeder clutch 34 is not engaged and/or when the feeder drive shaft 40 is rotating in a forward direction that the one-way bearing 46 is not configured to engage with. FIG. 9C shows the feeder gate elements 44 in the retracted position or down position after the document stack has been converted into an aligned document stack 14. The feeder gate elements 44 may have been oscillated according to one or more oscillation parameters in between FIGS. 9B and 9C such that the requisite amount of shuffling or jogging of the documents was performed to align the lead edges of the unaligned document stack 12. FIG. 9D shows the feeder gate element position upon feeding of the documents through the scanner system 10. As can be seen in FIG. 9D, the feeder gate elements 44 may remain retracted while the documents are fed through the scanner until the scanning operation is completed. Once the scanning operation is completed for an aligned document stack 14, the feeder gate elements 44 may be rotated back to the initial blocking position (i.e., to the "up" position) to prepare the scanner system 10 for the next scanning operation.

Figure 10:
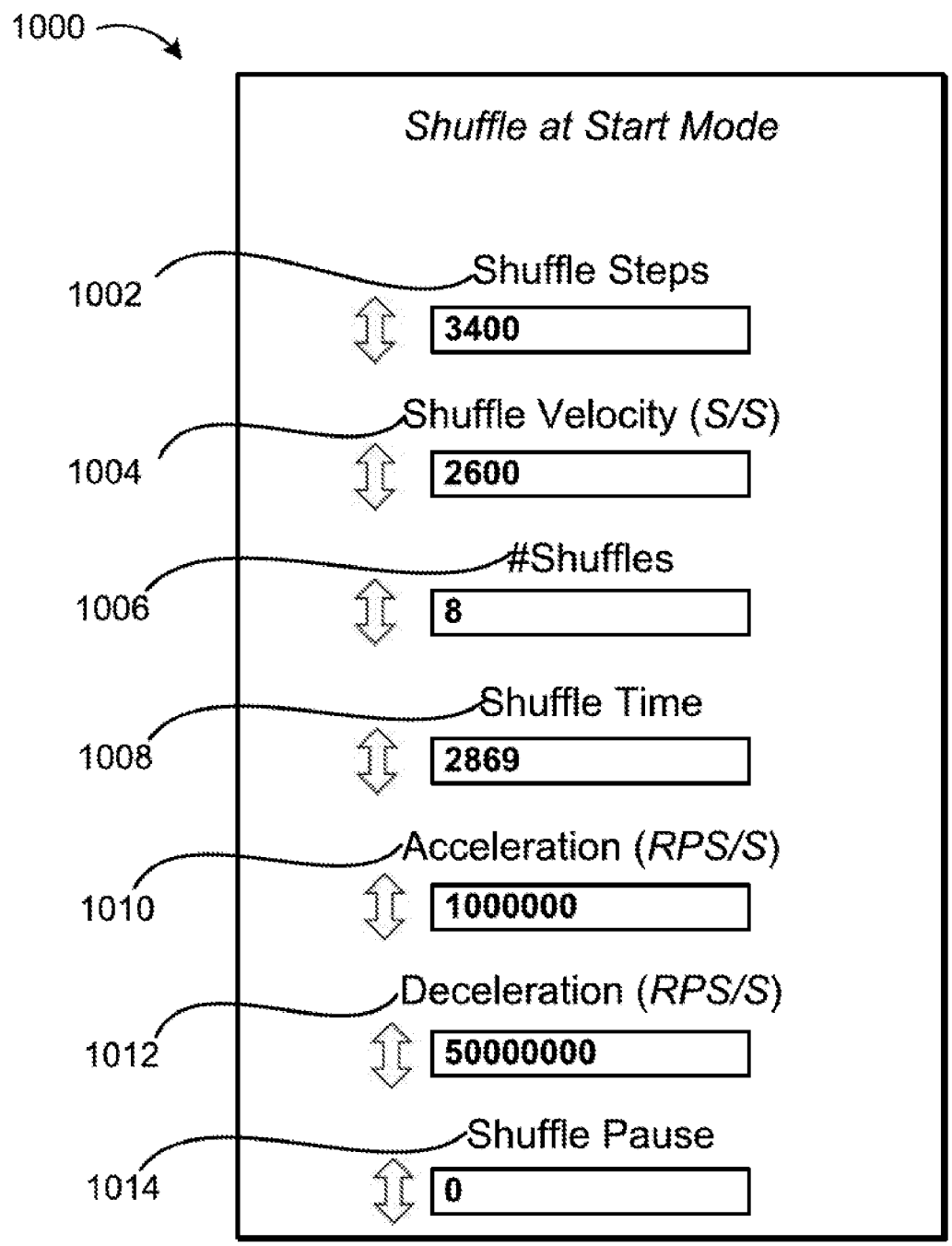
FIG. 10 illustrates an example interface for altering oscillation parameters, in accordance with an embodiment.

As shown in FIG. 10, in some embodiments, programmable oscillation parameters may be changed by the scanner operator via an interface 1000, which may be part of the document scanner system 10 or an external device or computer. Such programmable oscillation parameters may include, but are not limited to, an amplitude 1002 (the distance or angle the feeder gate elements 44 travel during each oscillation), the frequency of oscillation 1004, the total number of oscillation cycles 1006, the acceleration 1010 and deceleration 1012 of the feeder gate elements 44, and how long to pause between each oscillation 1014. The ability to change these programmable parameters is desirable to achieve optimal results for different types of document stacks, number of documents within each stack, and/or any other suitable variables.

In some embodiments, combinations of parameter settings may be available as presets for different document types. For example, a preset setting for sturdier document types may include higher amplitude but lower frequency oscillations to help separate the heavier documents, while a preset setting for lighter document may include lower amplitude and higher frequency oscillations to reduce the chance of damaging the documents. The operator may further tune the programmable parameters beyond the presets via an interface to achieve optimal results.

Additionally, in some embodiments, feedback sensing of the alignment quality of a document stack may be implemented using one or more sensors that determine the quality of the alignment of the document stack. The alignment quality feedback information may be passed to a processor that determines whether additional oscillations are necessary and/or uses the information to change oscillation parameters associated with the oscillation of the feeder gate elements 44. Additionally, document type sensors may be used to identify a document stack size, a material type for the documents, a width of the documents, a length of the documents, a density of the documents, and any other such conditions that may be used to determine the oscillation parameters of the jogger functionality.

Figure 11:
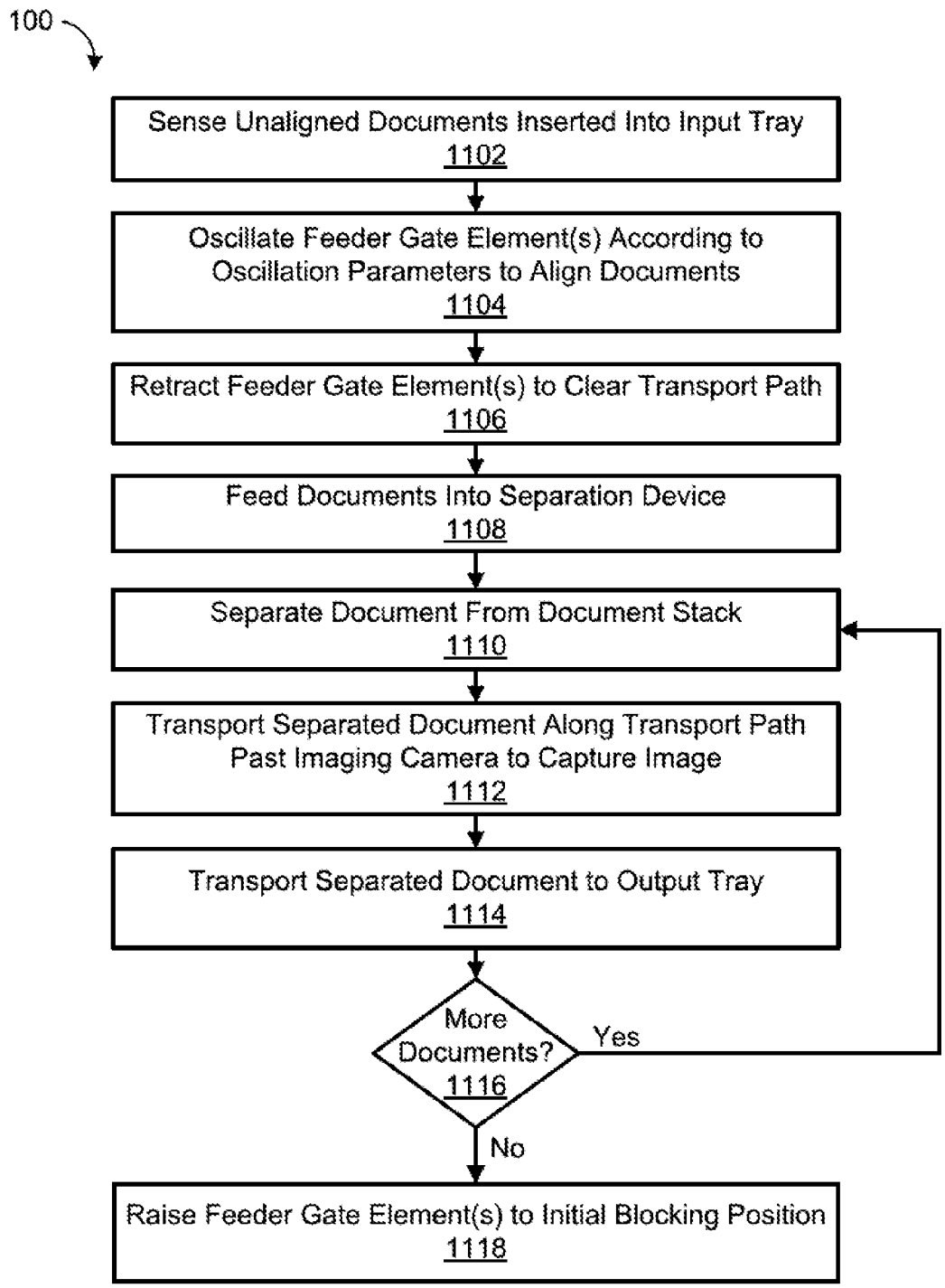
FIG. 11 shows a flow diagram of an exemplary method of aligning a stack of documents for scanning and scanning the aligned stack of documents, in accordance with an embodiment.

FIG. 11 shows a flow diagram of an exemplary method of aligning a stack of documents for scanning and scanning the aligned stack of documents, in accordance with an embodiment. At step 1102, the document present sensor 18 of the scanner system 10 senses documents in the input tray 54. As described above, the document present sensor 18 may be coupled to a document present sensor arm 19 that is pushed forward upon the insertion of one or more documents into an input tray 54. The document present sensor may provide a signal to a processor of the scanner system 10 to inform the scanner system 10 that documents are present and wake the scanner up and/or otherwise prepare the scanner system 10 for a scanner operation.

At step 1104, the processor determines that scanning has been initiated and a motion controller oscillates the feeder gate elements 44 according to oscillation parameters to align the documents in the document stack. The scanning may be initiated through any suitable method. For example, a user may press a scan button 58 on the scanner system 10 and/or may send a scan command to the scanner system 10. The processor of the scanner system 10 may receive an indication that scanning should be initiated and may activate the scanner system 10. A motor may be initiated and a motion controller may engage the feeder clutch 34 in response to the scanner being activated. As such, a feed roller drive shaft 40 and an urging roller shaft 98 may be energized such that the feeder gate elements 44, feed roller 20, and urging roller 16 are engaged and articulate according to one or more oscillation parameters. The feeder gate elements 44 may rotate with the feed roller drive shaft 40 forward and backward in relation to a transport path 22 such that the leading edges of the documents may be shuffled or "jogged" back and forth against the feeder gate elements 44. The jogging and shuffling of the documents in the document stack may create friction between the documents and may align the documents against the feeder gate elements 44 creating a uniform leading edge of the document stack.

At step 1106, once the oscillation operation has been completed, the motion controller retracts the feeder gate elements 44 to clear a transport path 22 for the documents.

The feeder gate elements 44 may be retracted by engaging a feeder gate "down" stop with a feeder frame stop 74. For example, a magnet on the feeder gate element 44 may be engaged with a feeder frame stop 74 that is made from a magnetic metal material. Accordingly, the feeder gate elements 44 may be held in a "down" position such that a path to a separated device is clear for the documents to interface with the separated device.

At step 1108, the stack of documents are fed into a separation device 21. The documents may fall to a separation device 21 through the force of gravity and/or an urging roller may be initiated to push the document stack into the separation device 21.

At step 1110, the separation device 21 may separate a document from the document stack for scanning. In some embodiments, the separation device 21 may form a separation "nip" area between a separation roller and a feed roller that separates a document from the document stack into a document transport path 22 for scanning of the document. Once the document is separated into the transport path 22, a document edge sensor 38 may determine that the leading edge of the document has passed into a first transport roller assembly 24 and the feeder clutch 34 may be disengaged such that the motor no longer feeds power to the feed roller drive shaft 40. At step 1112, the separated document is fed past an imaging camera 36 to capture an image of the content of the document. The document may be fed at a constant rate to ensure accurate capture of the information on the face of the document. The document edge sensor 38 senses the trailing edge of the separated document and indicates to the processor the end of the document. At step 1114, the separated document is fed out of the transport path 22 into an output tray 56.

At step 1116, the processor determines whether there are more documents to scan. For example, the processor may receive an indicator from the document present sensor 18 as to whether additional documents are present in the input tray 54. If additional documents are present, the feeder clutch 34 may be re-engaged and the next document may be separated from the document stack and the process steps of 1110-1116 may be repeated until each of the documents in the document stack have been scanned.

At step 1118, once all of the documents have been scanned and fed into the output tray, the motion controller may raise the feeder gate elements 44 to an initial blocking position by stopping the forward transport drive, engaging the feeder clutch 34, and reversing the drive motor to raise the feeder gate elements 44. The feeder gate elements 44 may block any documents inserted into the input tray 54 from contacting the separation device 21 when in the initial blocking position. Accordingly, the scanner system 10 is ready for the next scanning job and the process may be repeated for any future scan projects.

Figure 12:
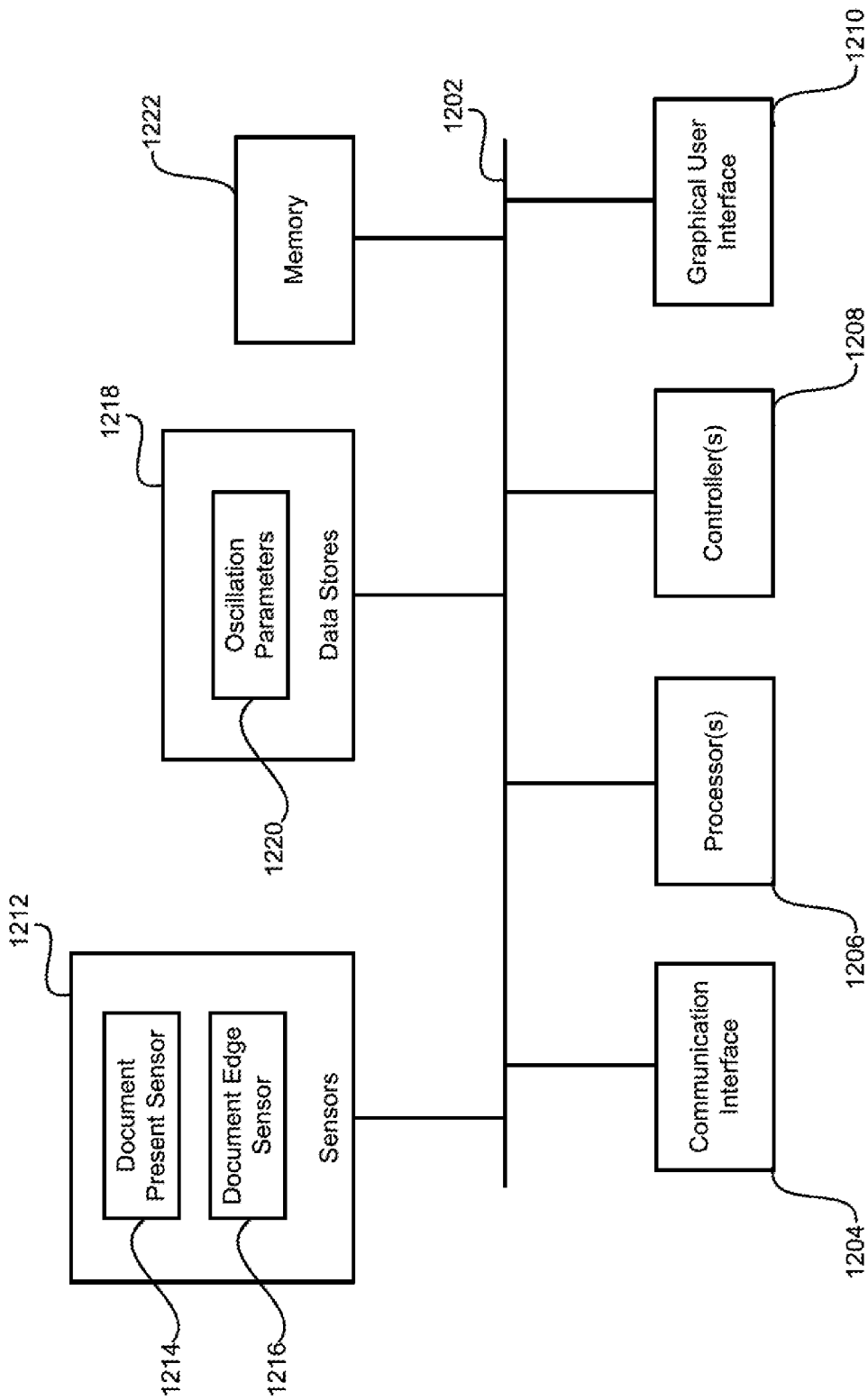
FIG. 12 shows a block diagram of an example automated document alignment control system, in accordance with an embodiment.

FIG. 12 shows a block diagram of an example automated document alignment control system, in accordance with an embodiment. The automated document alignment control system may include a memory 1222, data stores 1218, sensors 1212, a communication interface 1204, processor(s) 1206, motion controller(s) 1208, and a graphical user interface 1210.

The memory 1222 has a RAM (random access memory), ROM (read only memory), or other memory device, a hard disk or other fixed disk device, or flexible disk, optical disk, or other portable storage device. Further, the memory 1222 stores a computer program, database, and tables, which are used in various control function of the document scanner 10 and/or document alignment functionality of the document scanner 10. Furthermore, the system memory 1222 can also be used to store the captured images or processed images.

The processor 1206 is provided with a CPU (central processing unit) and operates based on a program which is stored in the system memory 1222. The processor 1206 can be a single programmable processor or can be comprised of multiple programmable processors, a DSP (digital signal processor), LSI (large scale integrated circuit), ASIC (application specific integrated circuit), and/or FPGA (field-programming gate array). The processor 1206 may be connected to a communication interface 1204, a graphical user interface 1210 for operator display, sensors 1212 including the document present sensor 1214 and the document edge sensor 1216, a data store 1218 storing oscillation parameters 1220 for the automated document alignment system, a motion controller 1208 for driving the various sub-systems and mechanical devices of the scanner system 10. The processor 1206 and/or the motion controller 1208 may control a transport drive and an image acquisition unit to acquire a captured image of a document. Further, the processor may interface with a motion controller 1208 and an image controller (not shown). These units are functional modules may be realized by software operating on a processor. These units may also be implemented on independent integrated circuits, a microprocessor, DSP or FPGA.

In various embodiments, the document alignment control system 1200 may be used to implement any of the systems, devices, or methods described herein. The document alignment control system 1200 can include various subsystems connected by a bus 1202.

In system 1200, bus 1202 facilitates communication between the various subsystems. Although a single bus 1202 is shown, alternative bus configurations may also be used. Bus 1202 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1202 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, communication interface subsystem 1204 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. Communication interface subsystem 1204 may also include identification or authentication devices, such as fingerprint scanners, voiceprint scanners, iris scanners, or other biometric sensors or detectors. In various embodiments, communication interface subsystem may include audio output devices, such as speakers, media players, or other output devices.

The communication interface 1204 may be further configured to facilitate communication between system 1200 and various external computer systems and/or networks (such as the Internet, a local area network (LAN), a wide area network (WAN), a mobile network, or any other network). Communication subsystem 1204 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for scanning documents, the system comprising:
    an input tray for holding one or more documents to be scanned;
    at least one roller element configured to feed the one or more documents to be scanned into a document transport path;
    a transport drive system configured to move a document of the one or more documents along the document transport path;
    at least one rotatable feeder gate element;
    a motion controller configured to:
        rotate the at least one rotatable feeder gate element to a blocking position to engage with lead edges of the documents held by the input tray;
        oscillate the at least one rotatable feeder gate element forward and backward in respect to the document transport path according to one or more oscillation parameters to align the lead edges of the documents along a vertical plane; and
        rotate the at least one rotatable feeder gate element to a retracted position such that the lead edges of the documents held by the input tray allow the documents to be transported along the document transport path;
    at least one sensor configured to determine the quality of the alignment of the leading edges of the documents along the vertical plane in the input tray and pass alignment quality information to a processor, wherein the processor is configured to determine at least one of:
        whether additional oscillations are necessary; and
        whether to change the one or more oscillation parameters; and
    at least one imaging device located along the document transport path and configured to image the document and provide digital image data to the processor.

2. The system of claim 1, wherein the at least one rotatable feeder gate element is coupled to a drive shaft of the transport drive system and the drive shaft rotates according to the one or more oscillation parameters to oscillate the at least one rotatable feeder gate element forward and backward along the document transport path.

3. The system of claim 2, wherein the one or more oscillation parameters include at least one of an amplitude, a frequency of oscillation, a total number of oscillation cycles, an acceleration of the at least one rotatable feeder gate element, a deceleration of the at least one rotatable feeder gate element, and how long to pause between each oscillation.

4. The system of claim 3, further comprising a document present sensor, and wherein the one or more oscillation parameters are based on a type of material of the documents inserted into the input tray, a number of documents inserted into the input tray, a width of the documents, and a length of the documents determined according to information received by the document present sensor.

5. The system of claim 2, wherein the at least one rotatable feeder gate element includes a down position stop, the down position stop configured to engage with a frame stop to constrain a forward movement of the at least one rotatable feeder gate element in respect to the document transport path.

6. The system of claim 5, wherein the down position stop includes a magnetized element and wherein the frame stop includes a ferromagnetic material such that the down position stop and the frame stop are attracted to one another.

7. The system of claim 2, wherein the at least one rotatable feeder gate element includes an up position stop, the up position stop configured to engage with a frame stop to constrain a backward movement of the at least one rotatable feeder gate element in respect to the document transport path.

8. The system of claim 1, wherein disengaging with the lead edges of the documents includes rotating the at least one rotatable feeder gate element into a frame body of the system.

9. The system of claim 1, wherein the oscillation forward and backward in respect to the document transport path causes the documents engaged with the at least rotatable one feeder gate element to slide between each other and to move towards the at least rotatable one feeder gate element, aligning the lead edges of the documents.

10. The system of claim 1, further comprising:
  detection sensors configured to detect leading and trailing edges of the document transported along the document transport path.

11. A method of aligning documents for a scanning device, the method comprising:
  determining, via a document present sensor, documents are present in an input tray of the scanning device, the leading edges of the documents being engaged with at least one rotatable feeder gate element of the scanning device rotated to a blocking position;
  oscillating, via a motion controller, the at least one rotatable feeder gate element forward and backward in respect to a document transport path of the scanning device according to one or more oscillation parameters to align the lead edges of the documents along a vertical plane;
  determining, via a sensor, a quality of the alignment of the leading edges of the documents along the vertical plane in the input tray and passing alignment quality information to a processor;
  determining, via the processor, at least one of:
    whether additional oscillations are necessary; and
    whether to change the one or more oscillation parameters;
  rotating via the motion controller, the at least one rotatable feeder gate element to a retracted position to clear the document transport path;
  separating, via a separation device, a document from the documents in the input tray of the scanning device;
  transporting the separated document along the document transport path within the scanning device using one or more rollers; and
  imaging the sheet with an imaging device along the transport path and providing digital image data to the processor.

12. The method of claim 11, further comprising:
  determining, by the processor based on information received from the document present sensor, that each document of the documents has been scanned; and
  rotating, via a motion controller, the at least one rotatable feeder gate element to the blocking position to block the document transport path.

13. The method of claim 11, wherein oscillating the at least one rotatable feeder gate element forward and backward in respect to the document transport path causes the documents engaged with the at least one feeder rotatable gate element to slide between each other and to move towards the at least one rotatable feeder gate element, aligning the lead edges of the documents.

14. The method of claim 11, wherein the at least one rotatable feeder gate element is coupled to a drive shaft of a transport drive system and wherein the drive shaft rotates according to the one or more oscillation parameters to oscillate the at least one rotatable feeder gate element forward and backward in respect to the document transport path.

15. The method of claim 14, wherein the at least one rotatable feeder gate element includes a down position stop, the down position stop configured to engage with a frame stop to constrain a forward movement of the at least one rotatable feeder gate element in respect to the document transport path.

16. The method of claim 15, wherein the down position stop includes a magnetized element and wherein the frame stop includes a ferromagnetic material such that the down position stop and the frame stop are attracted to one another.

17. The method of claim 14, wherein the at least one rotatable feeder gate element includes an up position stop, the up position stop configured to engage with a frame stop to constrain a backward movement of the at least one rotatable feeder gate element in respect to the document transport path.

18. The method of claim 11, wherein the one or more oscillation parameters include at least one of an amplitude, a frequency of oscillation, a total number of oscillation cycles, an acceleration of the at least one rotatable feeder gate element, a deceleration of the at least one rotatable feeder gate element, and how long to pause between each oscillation.

19. The method of claim 11, wherein the one or more oscillation parameters are based on a type of material of the documents inserted into the input tray, a number of documents inserted into the input tray, a width of the documents, and a length of the documents determined according to information received by the document present sensor.

20. The method of claim 11, further comprising:
  detecting the lead and trailing edges of the document sheet transported along the document transport path using one or more document edge sensors.

* * * * *